Sept. 10, 1946.   E. E. TURNER, JR   2,407,329
APPARATUS FOR SUBMARINE SIGNALING
Filed July 22, 1939   5 Sheets-Sheet 1

INVENTOR.
EDWIN E. TURNER JR.
BY
ATTORNEY.

INVENTOR.
EDWIN E. TURNER JR.
ATTORNEY.

INVENTOR.
Edwin E. Turner Jr.
BY
ATTORNEY.

Sept. 10, 1946.  E. E. TURNER, JR  2,407,329
APPARATUS FOR SUBMARINE SIGNALING
Filed July 22, 1939  5 Sheets-Sheet 4

INVENTOR.
Edwin E. Turner Jr.
BY
ATTORNEY.

Sept. 10, 1946.  E. E. TURNER, JR  2,407,329
APPARATUS FOR SUBMARINE SIGNALING
Filed July 22, 1939  5 Sheets-Sheet 5

INVENTOR.
EDWIN E. TURNER JR.
BY
ATTORNEY.

Patented Sept. 10, 1946

2,407,329

UNITED STATES PATENT OFFICE 2,407,329

APPARATUS FOR SUBMARINE SIGNALING

Edwin E. Turner, Jr., West Roxbury, Mass., assignor, by mesne assignments, to Submarine Signal Company, Boston, Mass., a corporation of Delaware Application July 22, 1939, Serial No. 285,910

2 Claims. (Cl. 177—386)

The present invention relates to translating devices for converting compressional wave energy to electrical energy and vice versa. More particularly, the present invention relates to such devices as used for signaling under water and is particularly concerned with the transmission and reception of compressional wave energy in a beam.

It has heretofore generally been understood that if a vibratable piston be made large in its dimensons in comparison with the wave length of the compressional waves at the signaling frequency, a concentration of energy along the axis perpendicular to the radiating surface will be obtained. However, such a concentration of energy in a main beam is accompanied by smaller concentrations of energy in directions at various angles with the axis of the main beam.

When the relative acoustic energy intensities in space in the free medium as produced by such a device are plotted with respect to the several angular directions from the axis perpendicular to the radiating surface as on polar coordinate graph paper, the main concentration of energy will appear as a large lobe representing the main beam, and a plurality of auxiliary lobes or ears representing the subsidiary energy concentrations in directions other than that of the main beam will also appear. These auxiliary lobes of the energy distribution pattern are often objectionable particularly for signaling under water as in acoustic ranging for the determination of the distance and direction of remote objects. Such subsidiary energy concentrations can be reduced by not driving the plane radiating surface as a piston but by driving it at varying amplitudes over its surface. A suitable amplitude distribution for this purpose will be shown below, but the present invention is primarily concerned with arrangements for obtaining any desired vibrational amplitude distribution of the radiating surface.

It should be noted that the characteristics referred to herein as applying to a compressional wave producing device also apply when the same device is used for receiving such waves.

Figure 1:
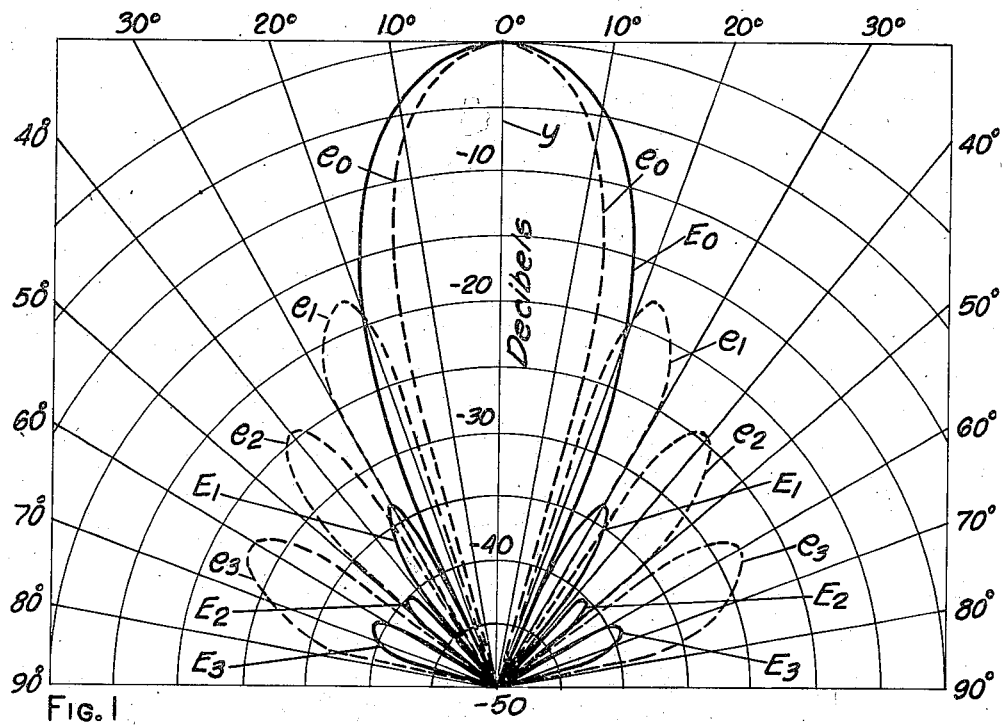
Figure 2:
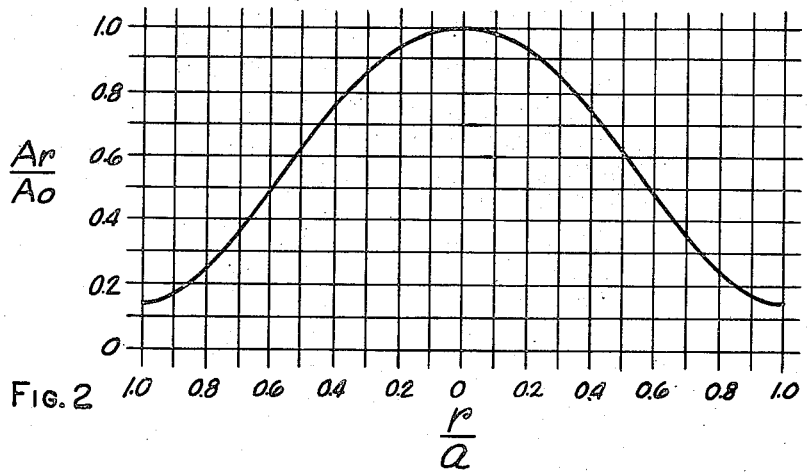
Figure 3:
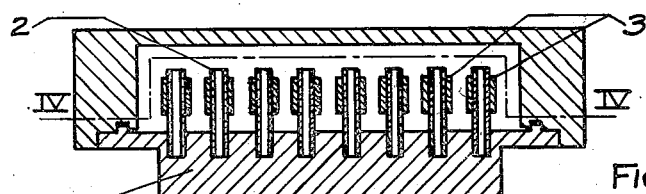
Figure 4:
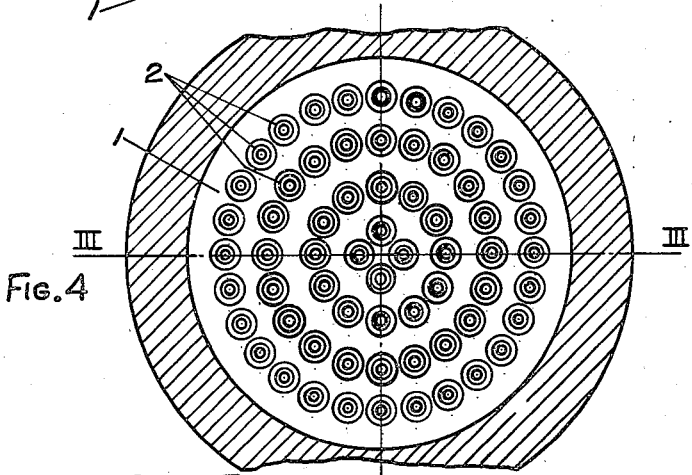
Figure 5:
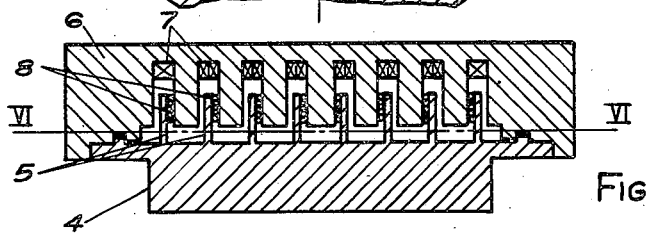
Figure 6:
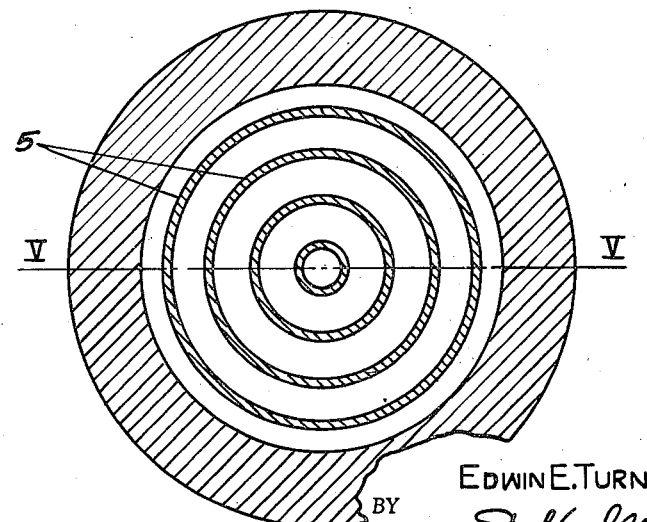
Figure 7:
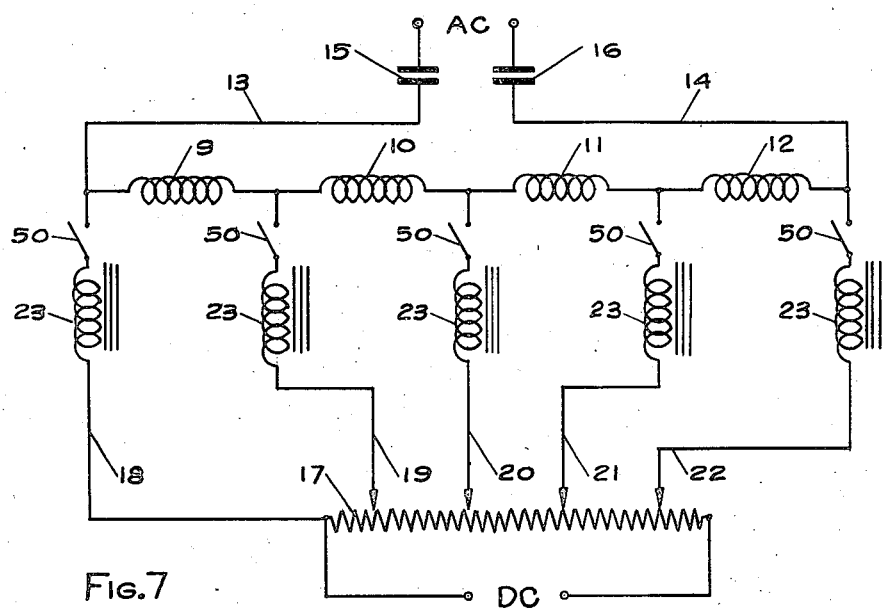
Figure 8:
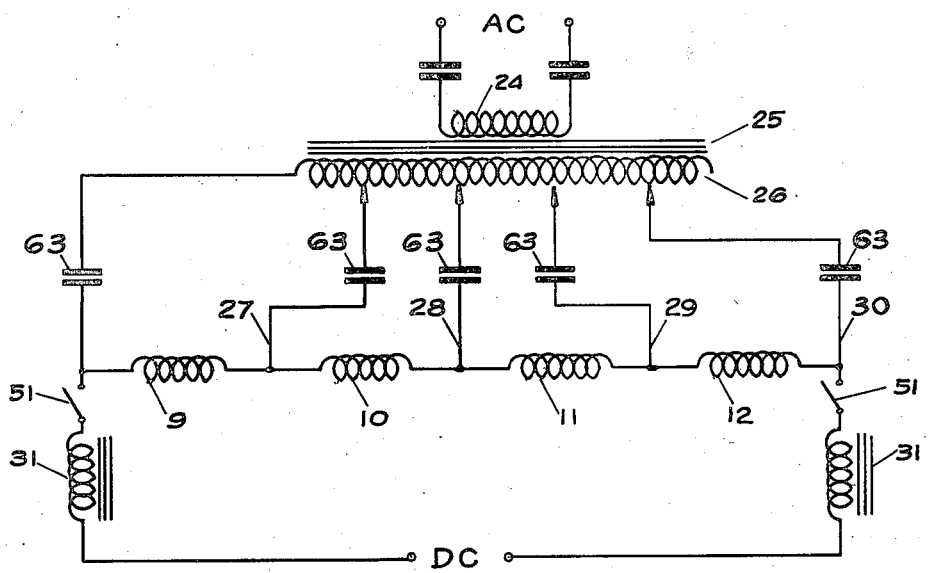
Figure 9:
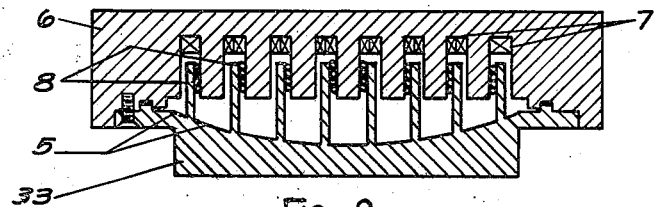
Figure 10:
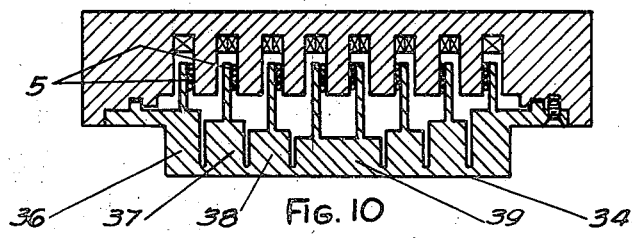
Figure 11:
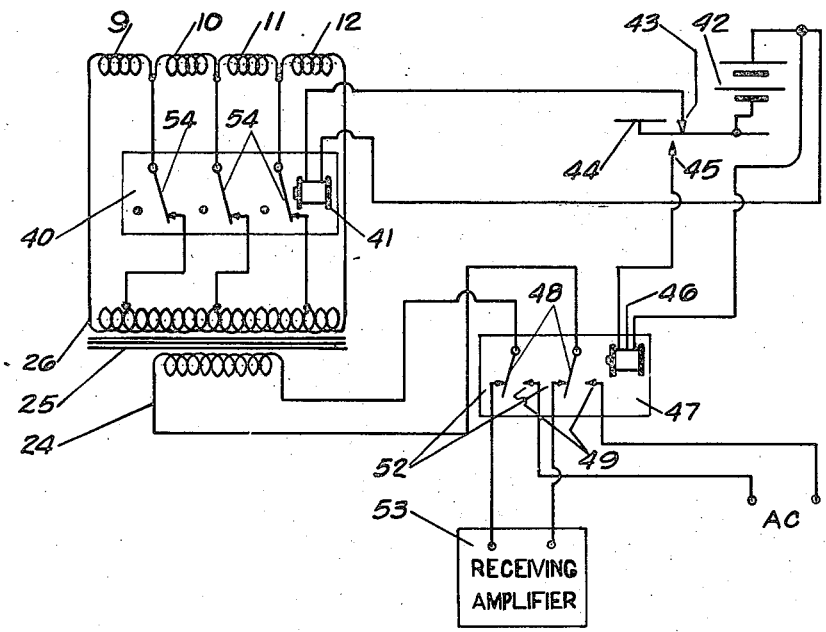
Figure 12:
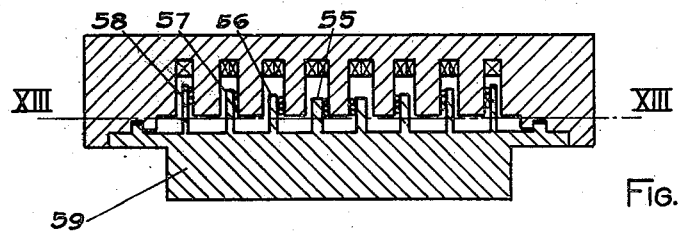
Figure 13:
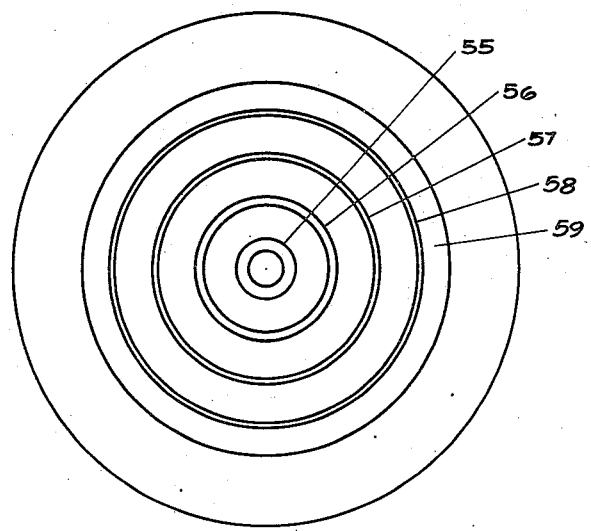
Figure 14:
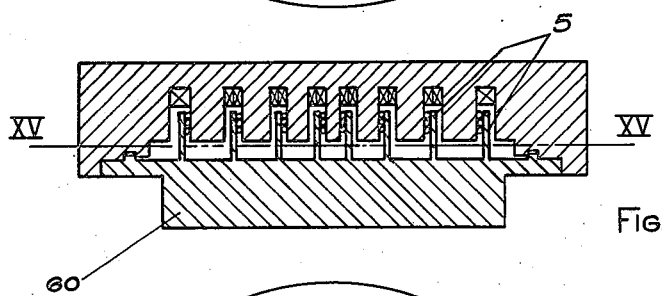
Figure 15:
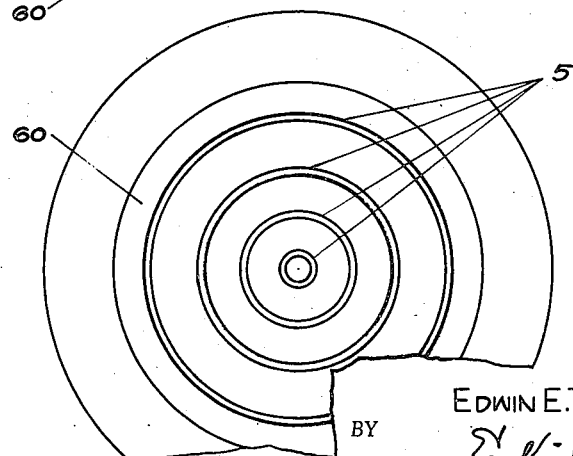

The invention will best be understood by the following description taken with reference to the accompanying drawings in which Fig. 1 is a polar diagram of representative compressional wave energy distributions; Fig. 2 is a graph showing a suitable radiating surface amplitude distribution for the production of one of the energy distributions shown in Fig. 1; Fig. 3 shows diagrammatically a cross section of a magnetostriction oscillator for producing compressional wave energy; Fig. 4 is a section of the same device along the line IV—IV in Fig. 3; Fig. 5 represents diagrammatically a cross section of an electrodynamic oscillator; Fig. 6 is a cross section of the device of Fig. 5 taken along the line VI—VI; Figs. 7 and 8 are schematic diagrams showing arrangements for electrically connecting the driving elements of the devices shown in Figs. 3 to 5; Fig. 9 is a vertical cross section of an electromagnetic oscillator similar to that shown in Fig. 5 but modified in accordance with a modification of the present invention; Fig. 10 is a vertical cross section of another modification of such an electrodynamic oscillator; Fig 11 is a schematic diagram of an arrangement for electrically operating the devices of Figs. 3 to 5; Fig. 12 is a vertical section of a further modification of an electrodynamic oscillator; Fig. 13 is a horizontal section of the device of Fig. 12 taken along the line XIII—XIII; Fig. 14 is a vertical section of a still further modification of an electrodynamic oscillator; and Fig. 15 is a horizontal section of the device of Fig. 14 taken along the line XV—XV.

As shown in Fig. 1, the energy distribution produced in a free medium by a representative extended, continuous, finite, plane radiating surface having a dimension greater than the wave length at the signaling frequency vibrating as a piston has a maximum energy concentration along an axis $y$ perpendicular to the radiating surface. At small angles from the axis $y$ the energy decreases as indicated by the dotted line $e_0$. At some larger angle from the axis $y$ the radiated energy will fall to zero and at a still greater angle again build up to a lower but still significant maximum value; then again fall to zero as the angle is further increased, and so on throughout the hemisphere facing the radiating piston. Thus, there will appear successive lobes of energy concentration at various angular distances from the axis $y$ as indicated in Fig. 1 by the lobes $e_1$, $e_2$ and $e_3$. If the piston be circular, it will be understood that these subsidiary lobes are in the form of hollow cones, the graph in Fig. 1 indicating merely the energy distribution in one plane.

A more desirable energy distribution pattern can be obtained by effectively varying the amplitude over the radiating surface from the edges to the center so that the greatest amplitude will occur at the center. If, for example, the vibrational amplitude be varied as shown in Fig. 2, the energy distribution represented by the solid curve in Fig. 1 can be obtained.

In Fig. 2 the linear amplitude of the radiating surface is indicated by the ordinates which represent the ratio $A_r/A_0$ representing the ratio of the amplitude at any radial coordinate measured from the center of the radiating surface to the amplitude at the center, so that the maximum amplitude is indicated as unity. Radial distances from the center of the radiating surface are indicated by the abscissae which specifically represent the ratio $r/a$ where $r$ is the radial distance from the center at any point and $a$ is the total radius of the radiating surface. The particular amplitude distribution curve shown in this figure follows the equation:

$$\frac{A_r}{A_0} = \frac{7 - 12\frac{r^2}{a^2} + 6\frac{r^4}{a^4}}{7} \qquad (1)$$

The amplitude distribution shown in Fig. 2 produces an energy distribution in the medium as shown by the solid curve in Fig. 1. The main lobe $E_0$ has somewhat greater width than the main lobe $e_0$ produced by uniform amplitude of the vibrating surface but the auxiliary lobes $E_1$, $E_2$ and $E_3$ are very much reduced in intensity.

To produce such a desired energy distribution or any other desired energy distrbution it is necessary to cause the radiating surface to vibrate with varying amplitudes over its surface when energy is being transmitted and conversely to cause the surface to produce electrical response which varies in a similar manner when receiving. Two arrangements for accomplishing this with devices of the type shown in Figs. 3 to 6 are shown in Figs. 7 and 8.

Figs. 3 and 4 show a magnetostriction oscillator having a radiating element 1 adapted by its outer surface to contact a signaling medium. This is driven by a plurality of tubes or rods 2 of magnetostrictive material firmly fixed to the element 1 at one end and free to vibrate at the other end. These tubes may be arranged over the inner surface of the element 1 in any convenient manner but preferably are fairly uniformly spaced and they may be arranged in concentric circles as shown in Fig. 4. For clearness only a relatively small number of tubes is shown although in practice it is not uncommon to use many hundreds of tubes. Each of the tubes together with its proportion of the element 1 forms a half wave length vibrating system with the node preferably located slightly above the inner surface of the element 1. Each tube is surrounded by an electromagnetic coil 3 to which electrical energy of the proper frequency is supplied for magnetostrictively setting the tubes and thereby the radiating surface into vibration or conversely for generating electrical energy when the radiating surface and the tubes are vibrated by compressional wave energy. An oscillator of this type is described in more detail in my copending application Serial No. 677,179, filed June 23, 1933.

Another form of oscillator is shown in Figs. 5 and 6. An element 4 having a radiating surface in contact with the signaling medium has a plurality of concentric rings 5 of electrically conductive material mounted on its inner surface. Four such rings are shown in the drawings although more may be used if desired. A magnetic field is produced across each of the rings 5 by means of an electromagnet 6 having a plurality of concentric poles extending between the rings and excited by direct current polarizing coils 7. Wound on or embedded in the outside surfaces of the concentric poles are alternating current windings 8 to which energy is supplied at the signaling frequency. The rings 5 are proportioned to have a height such that together with their respective portions of the element 4, they will each form a half wave length vibrating system at the signaling frequency. The entire system will, therefore, be set into vibration when the coils 8 are energized and conversely will generate an electromotive force in the coils 8 when the system is vibrated by compressional waves. An electrodynamic oscillator of this type is described in greater detail in my copending application Serial No. 24,078, filed May 29, 1935.

When all the coils of the magnetostriction oscillator shown in Figs. 3 and 4 or all the driving coils of the electrodynamic oscillator shown in Figs. 5 and 6 are excited with alternating current of the same amplitude and phase, the respective radiating surfaces will vibrate with a uniform amplitude over the entire surface and thereby will produce an energy distribution in the medium as indicated by the dotted curve in Fig. 1. Conversely if all the coils are connected to actuate an indicating device in a uniform manner, the device as a receiver will have a sensitivity in the various directions as indicated by the same dotted curve in Fig. 1.

To produce a different energy or sensitivity distribution I vary the ampere-turns of alternating current excitation of the coils associated with the driving elements over the area of the radiating element, or I provide different loadings of the driving elements, that is I vary the mass ratio between the mass of the driving elements and their respective associated proportions of mass of the radiating element.

The variation in ampere-turns can be accomplished in two ways, namely by varying the turns in the several coils and exciting all of them with the same current or by giving all the coils the same number of turns but different current excitation or by a combination of varying number of turns and different current values. The two fundamental arrangements are shown in Figs. 7 and 8.

In Fig. 7 the elements 9, 10, 11 and 12 indicate respectively the alternating current coils 8 for the four rings of the electrodynamic oscillator of Figs. 5 and 6 or the four circular groups of coils 2 of the magnetostriction oscillator shown in Figs. 3 and 4 with the individual coils of each circular group connected together in series. The grouping of the coils need not necessarily be circular, for this depends entirely upon the amplitude distribution and the beam pattern which it is desired to obtain.

With the magnetostriction oscillator the individual coils in each group are given the same number of turns but the coils for the different groups are given different numbers of turns, the group at the center having the largest number of turns. Similarly with the electrodynamic oscillator the coil for the innermost ring is given the greatest number of turns, the other coils being given successively smaller numbers of turns. In both cases the variation in the number of turns from the center toward the edge of the device is made to conform as nearly as possible to the desired amplitude distribution, for example, in accordance with Equation 1 given above. The elements 9, 10, 11 and 12 constituted as just described are connected in series and then across a suitable source of alternating current by means of the leads 13 and 14, condensers 15 and 16 interposed when necessary to prevent direct current from passing into the alternating current line and for power factor correction.

In the magnetostriction oscillator direct polarizing current is usually passed through the same coils as the alternating current. Since the coils in the various groups have different number of turns, the application of the direct current potential across all the groups connected in series would not provide the same ampere-turns of polarizing flux for all the magnetostrictive elements. To provide for this, a potentiometer 17 is connected across a source of direct potential and the several groups of coils are provided with successively larger direct potentials to make the polarizing ampere-turns in each group the same. This is accomplished by means of the common lead 18 and the potentiometer sliding contacts 19, 20, 21 and 22. In each of these leads chokes 23 are provided to avoid alternating current from passing through the potentiometer. For the supply of polarizing current in this manner, the switches 50 must, of course, be closed.

For the electrodynamic oscillator or for the magnetostriction oscillator in the case where separate polarizing coils are provided, the polarizing coils may, of course, simply all be given the same number of turns and suitable groups supplied in series or in parallel from a single direct current source whereby the polarizing flux in all the elements will be the same.

Any desired variation of ampere-turns can also be obtained by the modification shown in Fig. 8. In this case the elements 9, 10, 11 and 12 constituted as described with reference to Fig. 7 are all given the same number of turns. Alternating potential of the proper frequency is supplied to the primary 24 of a transformer 25 having a tapped secondary 26. The elements 9 to 12 are connected in series, one end of the combination being connected to one terminal of the secondary 26 and the junctions between the elements 9 to 12 being connected to the several taps as by the leads 27, 28, 29 and 30. The taps on the secondary 26 are adjusted so that the various elements 9 to 12 will be supplied with voltages varying in accordance with the desired amplitude distribution, for example, that according to Equation 1 above. Since all the elements 9 to 12 in this case have the same number of turns, they may be supplied with polarizing current from a single source of direct current through choke coils 31 by closing the switches 51. The condensers 63 prevent direct current from passing through the transformer winding 26. Since the elements 9 to 12 are all connected in series, they will all receive the same polarizing flux.

Another arrangement for producing desired amplitude variations over the radiating surface consists in varying the mass ratios of the several driving elements. Fig. 9 shows electrodynamic driving elements but it will be understood that magnetostrictive elements may similarly be used if desired. The electrodynamic elements 5 are similar to those shown in Fig. 5 and in horizontal section would appear as in Fig. 6. Likewise, the alternating current coils 8 and the polarizing coils 7 are similar to those shown in Fig. 5. The alternating current coils as well as the polarizing coils are connected electrically to have uniform excitation and to produce uniform electrical response when vibrated. However, the inner surface 32 of the radiating element 33 is made dish-shaped. By this means the outermost ring is associated with a much larger mass than is the innermost ring. All the rings, however, are tuned to the same frequency and the length of the several rings consequently varies. Therefore, the mass ratio varies between the successive rings whereby uniform excitation of the driving coils will produce a varying amplitude distribution of the radiating surface. Thus any desired amplitude distribution can be obtained simply by making the surface 32 of a different shape to conform with the particular distribution desired.

The mass ratio between the various driving elements of the radiating surface can also be varied by the arrangement shown in Fig. 10. In this case the radiating element 34 has its inner surface divided by narrow circular slots into a plurality of rings 36, 37, 38 and 39, each driven by one or more electrodynamic elements 5 which may be the same as those shown in Fig. 5 and in horizontal section would appear as in Fig. 6. The outermost portion 36 of the radiating member is made the thickest. The other elements 37, 38 and 39 progressively decrease in thickness, the thinnest element being at the center. The mass associated with the several driving elements 5 is therefore varied in a manner similar to that of Fig. 9, whereby with uniform excitation of the rings the radiating surface will vibrate at varying amplitude, the greatest amplitude being at the center. In this case, also, it will be understood that magnetostrictive driving elements can be substituted for the electrodynamic elements shown.

A further arrangement for obtaining a desired amplitude distribution over the radiating surface by variation of the mass ratios of the several driving elements is shown in Figs. 12 and 13. In this case the electromagnetic driving rings, of which four are shown, numbered 55, 56, 57 and 58, are made of successively diminishing thickness, the thickest ring being placed near the center. As in the other modifications the rings are all tuned to the same frequency having regard to the respective proportions of mass of the radiating element 59 which is associated with each. Each ring, therefore, together with its proportion of the element 59 forms a one-half wave length system at the signaling frequency. Since the ring at the center is thicker than the other rings, the ratio of its mass with respect to the portion of the mass of element 59 associated with it is smaller than the corresponding mass ratio for the other rings. The central portion of the radiating element 59 will therefore be driven at a greater amplitude, and the amplitude will gradually decrease toward the edges for successively decreasing ring thicknesses as shown. It will be evident from what has been said with reference to the other modifications that the variations in the thickness of the successive rings can be made to bring about any desired amplitude distribution over the radiating surface. It will also be evident that the same arrangement can be applied where magnetostrictive driving elements are employed. In this case the tubes or rods near the center of the diaphragm will be made thickest and successively thinner elements will be used at points out from the center to conform to any desired radiating surface amplitude distribution.

A still further modification for obtaining varying mass ratios is shown in Figs. 14 and 15. In this modification the driving rings 5 are again all of uniform thickness but are spaced different distances apart so that the several rings are associated with more or less of the mass and surface area of the radiating element, here numbered 60. Where a large amplitude at the center of the radiating surface is desired, the driving elements are spaced most closely at the center as shown. Since all the driving elements are supplied with the same power, those at the center being required to move the least radiating surface area, will drive the latter with the greatest amplitude. In this maner any desired amplitude distribution can readily be obtained. Where magnetostrictive driving elements are employed, they, too, of course, will be spaced close together at those areas of the radiating member where the greatest amplitude is desired.

When using apparatus of the type just described for echo ranging purposes it may be advantageous for the purpose of reducing stray signals and reverberations to a minimum to use one energy distribution pattern for transmission of the initial impulse and to use a different energy distribution pattern for receiving the echo. This is readily accomplished with the devices shown in Figs. 3 and 5, particularly when all the coils are given the same number of turns and the ampere-turns variation is obtained by varying the voltage applied to the several groups of coils. Fig. 11 shows an electric operating circuit for this purpose. Here the elements 9, 10, 11 and 12 representing the coils associated with the several rings of an electrodynamic oscillator or representing successive groups of series connected coils of a magnetostriction oscillator are connected to the tapped winding 26 of a transformer 25 through the contacts of a three-pole relay 40 having an operating coil 41. The latter is arranged to be energized from a battery or other current source 42 through the upper contact 43 of a sending key 44. When the key is not depressed, contact 43 will be closed and relay coil 41 energized whereby relay contacts 54 will all be closed. In this condition which is for receiving the elements 9 to 12 are each connected to appropriate portions of the winding 26 to produce a resultant response in the other winding 24 of the transformer in accordance with any desired energy distribution pattern preferably that defined by Equation 1. The winding 24 of the transformer 25 is at this time connected through the contacts 48, 52 of a double-pole, double-throw relay 47 to a receiving amplifier 53 which may be connected to any desired indicating device.

When the key 44 is depressed for sending a signal, contact 43 is open, thereby deenergizing relay coil 41 and permitting contact 54 to open. The elements 9 to 12 are then connected in series and together across the entire winding 26 of transformer 25. Depressing the key 44 also closes contact 45 energizing the relay coil 46, whereby contacts 48 move to the right as shown in the drawings and connect with contacts 49. The transformer winding 24 is thereby connected to a suitable source of alternating potential of the signaling frequency. Since the elements 9 to 12 are now all connected in series, they will be energized equally and, assuming that they have the same numbers of turns, the energy distribution pattern for the transmitted signal will be that of a piston as is represented by the dotted curve in Fig. 1.

By this arrangement it will be noted that the transmitted signal has a strong main beam together with subsidiary maxima at various angular directions to its axis. On receiving, however, the sensitivity distribution if made in accordance with Equation 1 will correspond to the solid curve in Fig. 1. The auxiliary maxima will be seen to be of much lower intensity in this case and the largest one $E_1$ lies in a direction different from that of any of the subsidiary maxima of the dotted curve. Consequently energy transmitted in directions other than that of the main beam, after reflection from a distant object or from discontinuities in the medium, will not be received with appreciable intensity.

The arrangement shown in Fig. 11, therefore, provides a means for changing from one energy distribution pattern to a different energy distribution pattern between sending and receiving. It will be evident that the arrangement shown is not limited to the use of the particular energy distributions shown in Fig. 1, but that any other two different distributions may be employed if desired. It is, however, particularly advantageous if the subsidiary maxima during reception do not coincide in direction with the subsidiary maxima obtained during transmission and also when the subsidiary maxima during reception are as small as possible in intensity. This arrangement is also of especial importance when it is desired to receive as little energy as possible from directions outside of the main beam and yet to transmit as much energy as possible into water during sending. Since a piston radiating surface has uniform amplitude all over its surface, its entire surface can be driven at the maximum possible amplitude, namely that at which cavitation occurs, whereby the greatest possible amount of energy will be radiated along the main axis perpendicular to the radiating surface. When some other amplitude distribution is employed, only the area of maximum amplitude can be permitted to reach the cavitation limit, while the remainder of the surface must vibrate at a lower amplitude. This results in a decreased total energy output, and at the same time decreases the maximum energy radiated along the main axis. The use of the arrangement shown in Fig. 11, however, makes it possible to radiate maximum total energy during transmission and yet have the benefits of a special distribution pattern during reception.

Having now described my invention, I claim:

1. A submarine signaling device having a solid unitary radiating member having a continuous radiating surface of surface dimensions many times the wave length of the compressional waves in the signaling medium at the signaling frequency, said surface adapted to be in contact with the signaling medium, said radiating member having a reverse surface opposed to said first surface with a plurality of metallic elastic longitudinally vibratable elements mounted thereon substantially extending over the entire radiating member, a plurality of electric current-carrying coils operatively associated with said metallic elements for vibrating the same, said electric current-carrying coils positioned nearer the center of the radiating member having a greater ampere-turns magnitude than the coils operatively associated with the metallic elements nearer the periphery of the radiating member whereby the radiating areas near the center of the radiating member are excited with larger amplitudes than areas progressively away from the center of the radiating member for the purpose of reducing the intensity of the secondary lobes of the beam pattern of the submarine signaling device.

2. A submarine signaling device having a solid unitary radiating member having a continuous radiating surface of surface dimensions many times the wave length of the compressional waves in the signaling medium at the signaling frequency, said surface adapted to be in contact with the signaling medium, said radiating member having a reverse surface opposed to said first surface with a plurality of magnetostrictive longitudinally vibratable rods mounted thereon substantially extending over the entire radiating member, a plurality of electric current-carrying coils surrounding said tubes for operatively energizing the same, said electric current-carrying coils having connections whereby they are operated in groups with respect to their distance from the center of the radiating member, the groups of coils nearer the center of the radiating member having greater ampere-turns magnitude than the coil groups progressively away from the center whereby the radiating areas near the center of the radiating members are excited with larger amplitudes than areas progressively away from the center of the radiating member for the purpose of reducing the intensity of the secondary lobes of the beam pattern of the submarine signaling device.

EDWIN E. TURNER, Jr.